United States Patent [19]

Jeffress

[11] Patent Number: 5,141,153
[45] Date of Patent: Aug. 25, 1992

[54] ENERGY CONSERVATION AND ANTI-SCALD/BURN SINGLE HANDLE VALVE CONSTRUCTION

[75] Inventor: Ronald E. Jeffress, Avon Lake, Ohio
[73] Assignee: Moen Incorporated, Elyria, Ohio
[21] Appl. No.: 780,438
[22] Filed: Oct. 16, 1991

Related U.S. Application Data

[63] Continuation of Ser. No. 481,238, Feb. 20, 1990, abandoned.
[51] Int. Cl.⁵ .................................. G05D 23/02
[52] U.S. Cl. ................... 236/93 B; 137/614.18; 236/101 D
[58] Field of Search ............ 236/93 B, 101 D; 137/614.18

[56] References Cited

U.S. PATENT DOCUMENTS

| | | | |
|---|---|---|---|
| 1,814,512 | 7/1931 | Hetherington | 236/93 B X |
| 2,228,626 | 1/1941 | Hetherington | 236/93 B X |
| 2,534,378 | 12/1950 | Schlaich | 236/93 B X |
| 4,227,646 | 10/1980 | Hart et al. | 236/93 R |
| 4,778,104 | 10/1988 | Fisher | 236/93 B X |
| 4,782,853 | 11/1988 | Moen | 137/454.6 |
| 4,854,499 | 8/1989 | Neuman | 236/93 B |

FOREIGN PATENT DOCUMENTS 2-183023  1/1989  Japan.

Primary Examiner—William E. Tapolcai
Attorney, Agent, or Firm—Kinzer, Plyer, Dorn McEachran & Jambor

[57] ABSTRACT

A water temperature sensing/flow control mixing valve has a valve body with hot and cold water inlets and at least one outlet. A mixing valve member is positioned within the valve body and controls the proportion of hot and cold water that flows from the outlet. A water flow restrictor is positioned within the valve body and movable from a normal flow position in which outlet flow is unobstructed to a position in which the restrictor partially closes the outlet to limit flow therefrom. There is a shaped memory metal actuator positioned within the valve body to move the restrictor from the normal flow position to the flow limiting position when the water within the valve body exceeds a predetermined temperature.

21 Claims, 3 Drawing Sheets

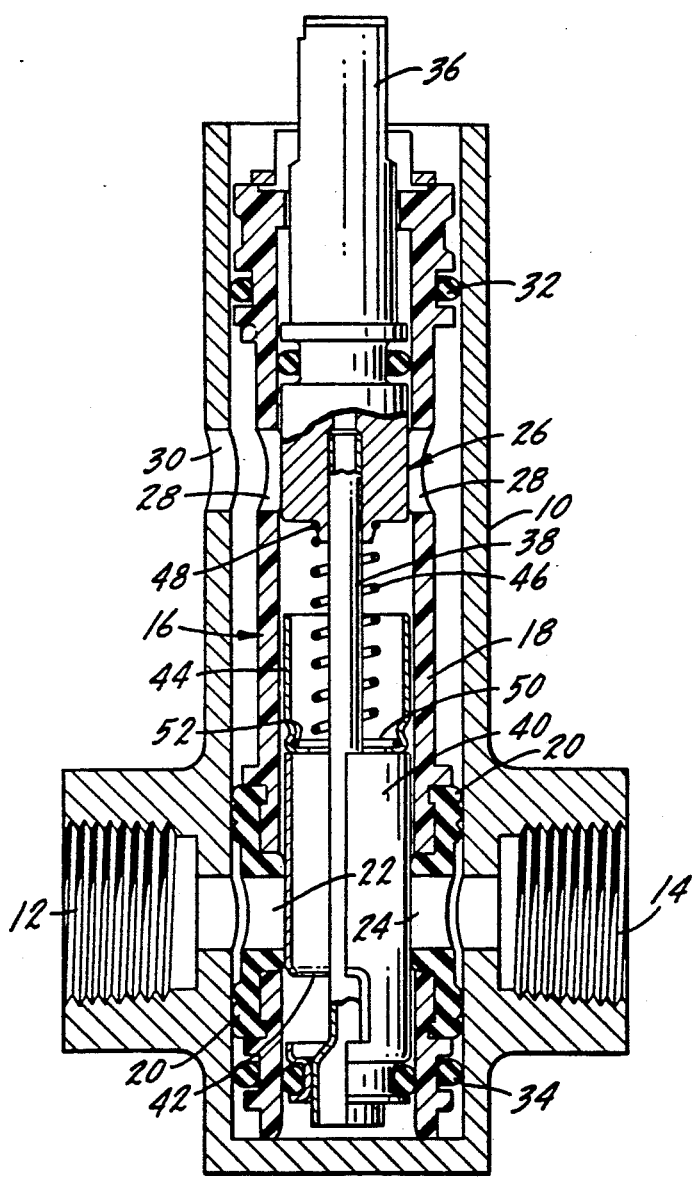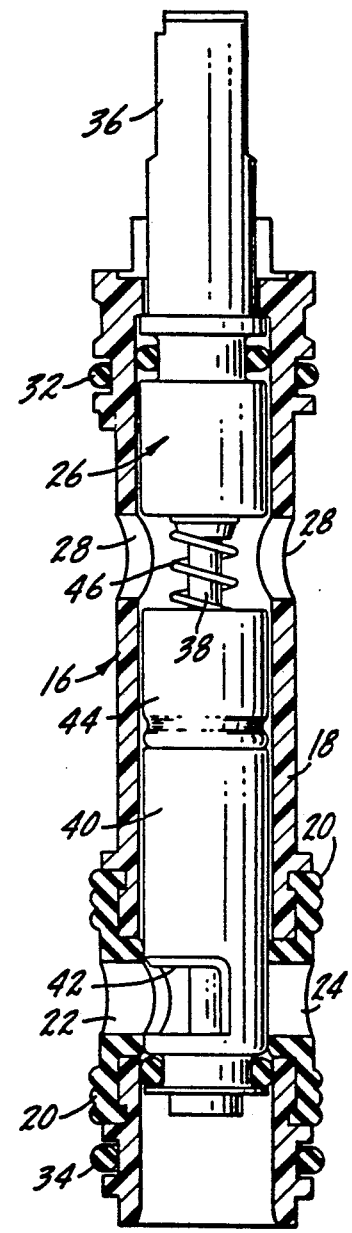
fig.1.
fig.2.

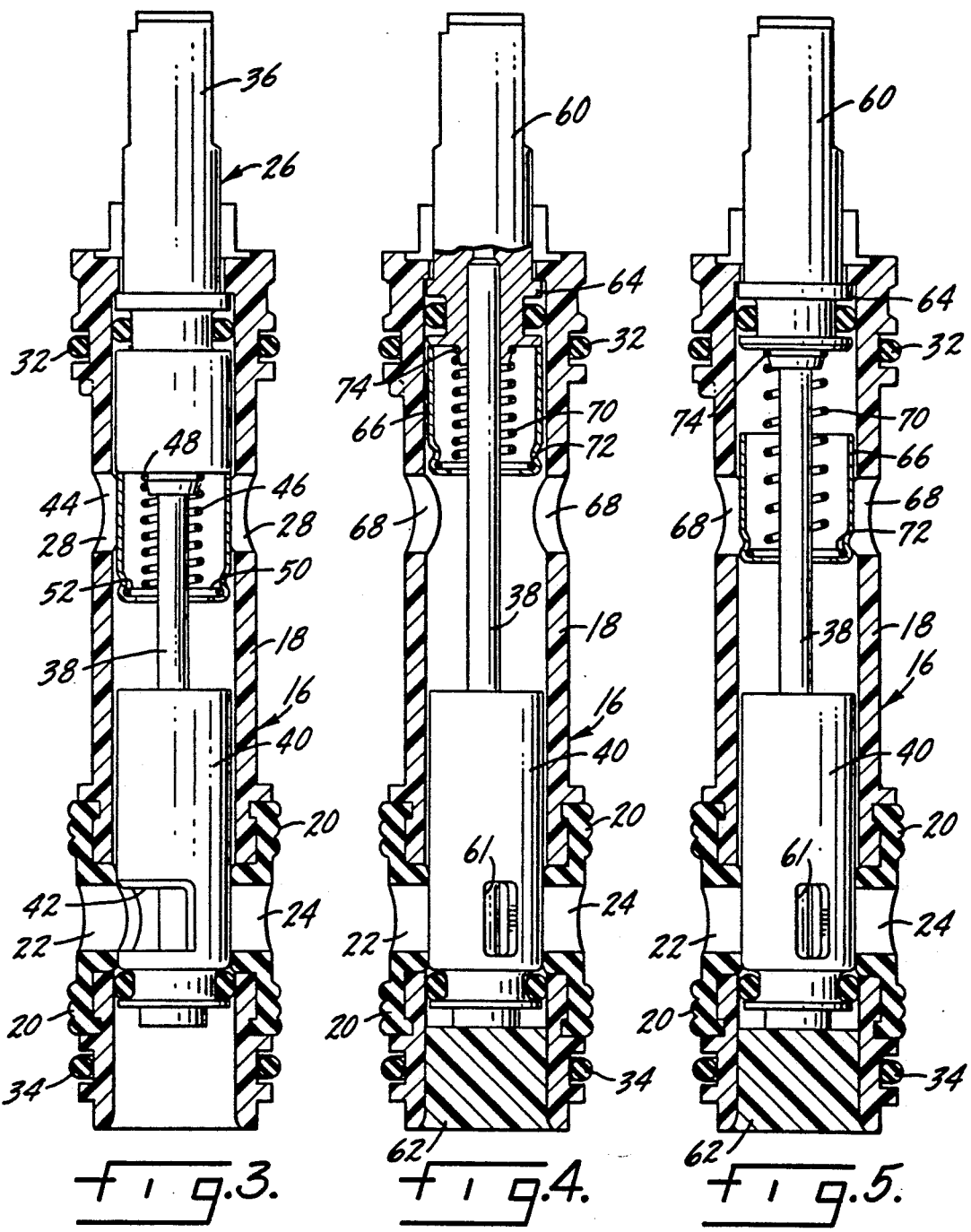

ENERGY CONSERVATION AND ANTI-SCALD/BURN SINGLE HANDLE VALVE CONSTRUCTION

This is a continuation of Ser. No. 07/481,238 filed on Feb. 2, 1990, now abandoned.

SUMMARY OF THE INVENTION

The present invention relates to an energy conservation and anti-scald/burn single handle mixing valve.

A primary purpose of the invention is to provide a mixing valve which has means for sensing temperature and controlling flow when the temperature exceeds a predetermined maximum.

Another purpose of the invention is a simply constructed reliable valve construction including means for restricting flow when the temperature of water flowing through the valve exceeds a predetermined limit.

Another purpose of the invention is to provide a single handle mixing valve which provides automatic temperature protection in a very economical construction.

Another purpose of the invention is to provide a mixing valve which has a temperature responsive flow restrictor moved into a flow limiting position by the use of a shaped memory metal actuator.

Another purpose of the invention is to provide a valve construction, normally placed in close proximity to the sources of hot and cold water, which reliably restricts flow under excessive temperature conditions.

Another purpose is a mixing valve construction of the type described in which the flow restrictor moves in the area of lowest flow velocity and in which the memory metal actuator is positioned in the area of greatest flow velocity.

Other purposes will appear in the ensuing specification, drawings and claims.

BRIEF DESCRIPTION OF THE DRAWINGS

The invention is illustrated diagrammatically in the following drawings wherein:

FIG. 1 is a partial axial section, illustrating the mixing valve of the present invention positioned within a valve housing and showing the valve in a normally closed position, FIG. 2 is a partial axial section, showing the mixing valve of FIG. 1 in an open position, FIG. 3 is a partial axial section, showing the mixing valve of FIGS. 1 and 2 in a flow limiting position, FIG. 4 is a partial axial section, showing a modified form of mixing valve, FIG. 5 is a partial axial section, showing the mixing valve of FIG. 4 in a flow limiting position.

DESCRIPTION OF THE PREFERRED EMBODIMENT

Figure 6:
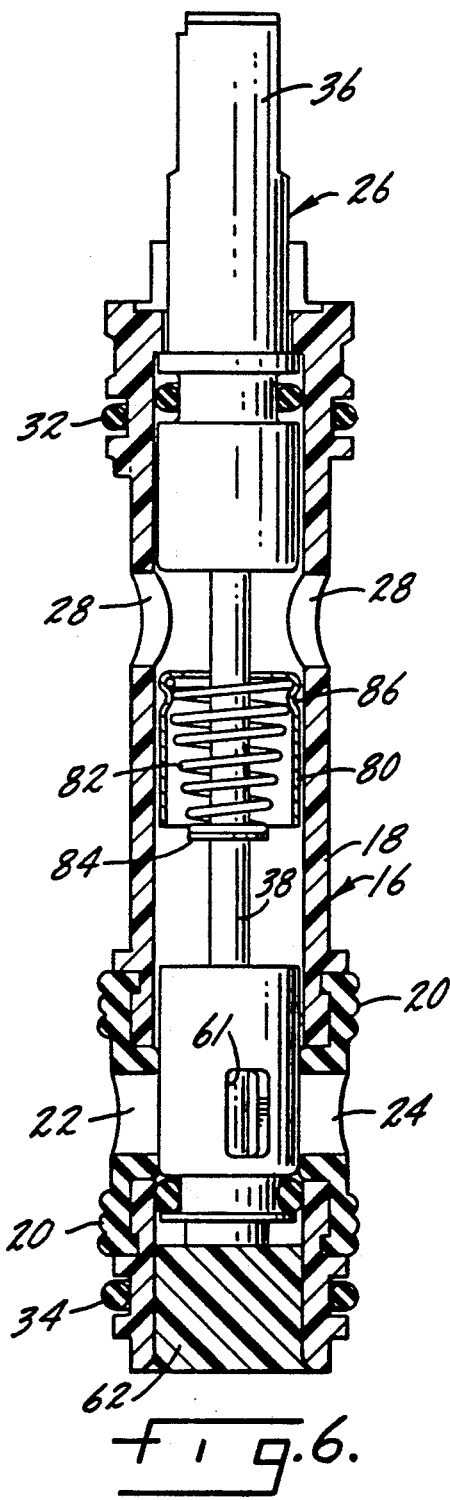
FIG. 6 is a partial axial section of a further form of mixing valve.

The present invention relates to a water temperature sensing or detection/flow control mixing valve which may find use as a shower/tub control or in a lavatory or kitchen faucet. The mixing valve design is similar to that shown in U.S. Pat. Nos. 3,730,222, 3,840,048, 4,330,011 and 4,782,853, all owned by the assignee of the present application. All such valves have a valve member which rotates to control water temperature and which reciprocates to control water volume. U.S. Pat. No. 4,469,121, also owned by the assignee of the present application, shows a similar valve structure in which there is no volume control, and water temperature is controlled by valve member rotation. The water temperature sensing and flow control construction disclosed herein is applicable to both types of valves.

There is a substantial need in the plumbing art for a valve which is responsive to excessive water temperature, both in terms of energy conservation and in preventing a valve user from being scalded or burned. Particularly in the area of shower./tub controls, it is necessary to prevent an unsuspecting water user from being subjected to a sudden surge of hot water. Conventional water control valves have no means to detect and automatically limit the flow of excessively hot water. Anti-scald devices are usually associated with a shower head or other form of discharge device that is located a substantial distance from the water supplies and control valve. The present invention uniquely incorporates an antiscald mechanism within a mixing or control valve.

The valve includes a movable flow restrictor. The actuator for the flow restrictor as disclosed herein may be made of a nickel-titanium alloy known commercially as "memory metal" and which is disclosed in U.S. Pat. No. 4,778,104. Such a material can be formed into a predetermined shape, for example a coil spring, and will retain that shape under normal water temperature conditions. If water at an excessive temperature, above a predetermined limit, is applied to the actuator spring, the spring will either contract or expand, depending upon the parameters used in initially forming the spring. The expansion or contraction provides the means for moving the flow restrictor from a position in which it is normally unrestrictive to water flow through the valve to a position in which it substantially, but desirably not completely, limits flow through the valve. The flow restrictor will remain in the flow limiting position as long as the water within the valve remains at an elevated temperature. The actuator is cools down by having the restrictor permit leakdown of water from the valve to the discharge or outlet of the valve, but at a sufficiently slow rate so as to not provide any hazardous conditions to a water user.

Anti-scald devices that are known in the art, such as that shown in U.S. Pat. No. 4,778,104, are installed at or near the water outlet and therefore do not have a reaction or recovery time as rapid as the valve construction disclosed herein which is quite close to the source of hot water. Quick detection and reaction reduces the amount of high temperature water in the delivery system. This has several benefits. First, the presence of hot water can quickly be detected and throttled down to a hold condition to await adjustment by the user to a more moderate temperature. This provides a saving in both water and heat energy when the faucet is turned on in the full hot position and left to purge itself of ambient temperature water. Second, when the flow has been throttled down, there is less hot water in the delivery system and thus less heat is absorbed by the system. When cooler flow is restored there is less heat to draw from the system, thus an additional advantage in recovery time. Last, because of the smaller volume of hot water, the thermal mass of the delivery system more easily mitigates the water temperature and further reduces the risk of delivery of high temperature water to the outlet. This is particularly advantageous in shower/tub installations where distance from the control valve to the outlet can be very lengthy.

In FIG. 1, a valve housing 10 has a hot water inlet port 12 and a cold water inlet port 14. Positioned within the housing 10 is a mixing valve in the form of a cartridge and generally designated at 16. The cartridge 16, which may be substantially similar t the mixing valve cartridges disclosed in the above-designated patents, includes a valve body 18 having seal members 20 at its hot water inlet port 22 and its cold water inlet port 24, and a movable valve stem or valve member designated generally at 26. The valve body 18 includes the described inlet ports and a plurality of outlet ports 28 which are in alignment with an outlet port 30 in housing 10. Valve body 18 mounts seal rings 32 and 34 which prevent water from leaking outwardly from housing 10.

Valve stem 26 includes a handle receiving portion 36 which extends outwardly from the housing and from the valve body and which is attached by a thin rod 38 to a hollow piston 40. In the closed position of FIG. 1, piston inlet 42, which may be arcuate in circumferential configuration, is positioned interiorly of the valve body inlet ports 22 and 24 so that no water flows inside of the valve The seal members 20 are urged against the exterior of the cylindrical piston 40 to prevent water flow into the valve interior.

FIG. 2 shows the open position of the valve and stem 26 has been pulled outwardly from the valve body to the point that the stem piston inlet 42 is in radial alignment with the hot and cold water inlet ports s that a mixture of water from these ports may reach the interior of the valve body and flow inside of piston 40. Under normal operating conditions, water will then flow through the interior of the valve body to outlets 28 and housing outlet 30.

A flow restrictor or sleeve 44 is mounted coaxial with piston 40 about rod 38 and is movable within the valve body generally adjacent its periphery. A memory metal coil spring 46 extends coaxially about rod 38 and is fastened at its upper end 48 to a portion of stem 26. An innermost coil 50 of spring 46 has an enlarged diameter and fits within a recess 52 in the innermost end of sleeve 44 to thereby attach the sleeve to the spring.

Under normal operating conditions, the sleeve will be in the FIG. 2 position and will not restrict flow through the valve. In the event water of excessive temperature reaches the interior of the valve, either because stem 26 is in the full hot position, or because of a sudden decrease in the supply of cold water, spring 46 will contract to the FIG. 3 position. This has the effect of moving sleeve 44 to a position in which it masks valve body outlet ports 28 thus substantially restricting or limiting flow through the valve. Sleeve 44 will remain in this position as long as spring 46 is in the contracted condition and the spring will remain contracted as long as the temperature of the water within the valve is above a predetermined maximum limit. When the water temperature within the valve body decreases, the spring will assume its normal configuration, as illustrated in FIGS. 1 and 2, and this will push the sleeve 44 to the open position of those figures.

The outer diameter of flow restricting sleeve 44 is slightly less than the interior diameter of the valve body. This provides for a leakage of water around the restrictor to the outlet ports of the valve cartridge when the restrictor is in the flow limiting position. This enables the hot water within the valve cartridge to be purged so that the valve may return to a normal operating position.

It is important to note that the path of movement of sleeve 44 is directly adjacent the periphery or the inner wall of the valve body which is the area of lowest water velocity. Spring 46, however, is positioned generally at the center of the tubular passage formed between the valve body inlets and outlets and therefore is at the point of highest water velocity. This has the effect of insuring that water temperature in the valve is correctly sensed by the spring and of insuring that there is the least resistance to movement of sleeve 44 when it must of necessity move to a closed or open position. Sleeve 44 is open at its opposite ends and so provides no restriction to normal water flow through the valve.

In the embodiment of FIGS. 4 and 5, in which like parts have been given like numbers, valve stem 60 only rotates and it is prevented from reciprocal movement by a plug 62 at the bottom of the valve cartridge and by an outwardly-extending shoulder 64 adjacent the upper end of the stem. Since valve stem 60 cannot axially move to a closed position, as in the FIGS. 1-3 embodiment, the valve stem has a plurality of circumferentially spaced inlet ports 61, rather than a single arcuate inlet port. The mixing valve of FIGS. 4 and 5 more customarily finds utility in a shower/tub installation in which it is normally not necessary to adjust water volume, but only water temperature.

In the FIGS. 4 and 5 embodiment, restrictor sleeve 66 is positioned above valve body outlet ports 68 and is held in that position by a memory metal spring 70 which is attached by an enlarged coil 72 to one end of the sleeve and by a coil 74 to a portion of the valve stem. The spring of the FIG. 4 and 5 embodiment is normally contracted, whereas, the memory metal spring in the FIGS. 1-3 embodiment is normally expanded. In the FIGS. 4 and 5 configuration, when spring 70 senses water at an elevated temperature, the spring will expand, moving sleeve 66 from the upper position of FIG. 4 to the flow restricting position of FIG. 5.

Figure 7:
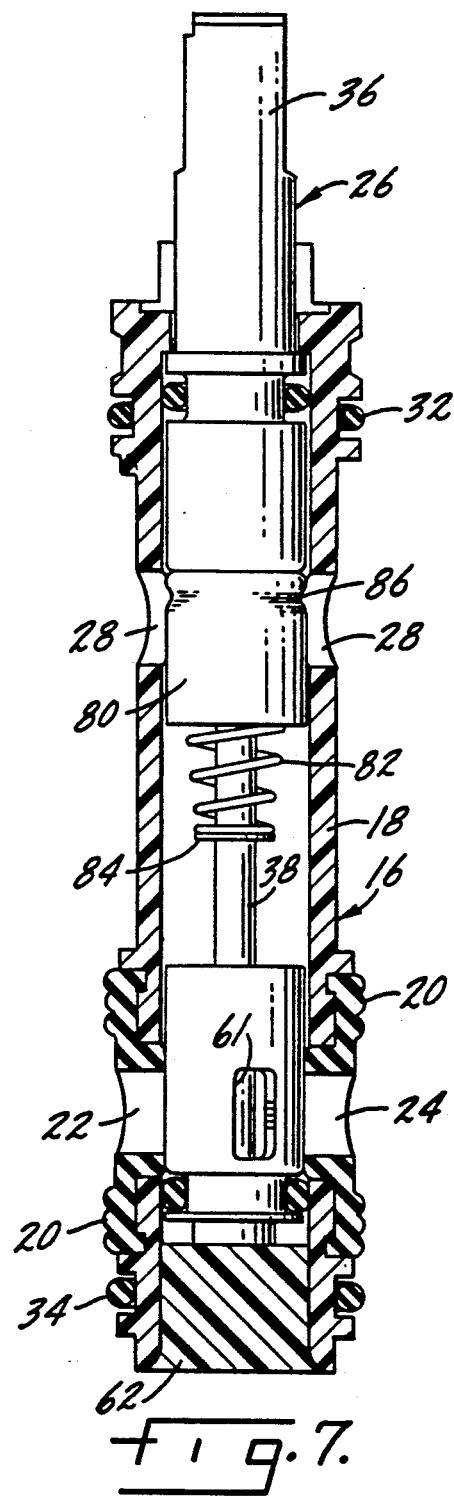
FIG. 7 is a partial axial section, showing the mixing valve of FIG. 6 in a flow limiting position.

In the valve of FIGS. 6 and 7, like parts have again bee given like numbers. Restrictor sleeve 80 encloses a memory metal spring 82 which is supported on a ring 84 attached to rod 38. The upper coil of the spring is fixed to sleeve 80 by a circumferential sleeve recess 86.

Spring 82 is contracted in the normal water flow position of FIG. 6 and water from the inlet ports flows around the spring and through the interior of the sleeve. When the spring senses water at an excessive temperature, the spring expands, moving the sleeve to the FIG. 7 position in which it masks the sleeve outlet ports.

Whereas the preferred form of the invention has been shown and described herein, it should be realized that there may be many modifications, substitutions and alterations thereto.

The embodiments of the invention in which an exclusive property or privilege is claimed are defined as follows:

1. A water temperature sensing/flow control mixing valve, including a valve body having hot and cold water inlets and at least one outlet, a mixing valve member positioned within said valve body and controlling the proportion of hot and cold water that flows from said inlets to the outlet, a water flow restrictor positioned within said valve body and movable from a normal flow position in which outlet flow is unobstructed to a position in which the restrictor partially closes said outlet to limit the flow therefrom, and a shaped memory metal actuator positioned within said valve body to move said restrictor from the normal flow position to said flow limiting position when the water within said valve body exceeds a predetermined temperature.

2. The mixing valve of claim 1 further characterized in that said restrictor moves within said valve body in the area of lowest flow velocity.

3. The mixing valve of claim 1 further characterized in that said shaped memory metal actuator is positioned within said valve body in an area of highest flow velocity.

4. The mixing valve of claim 1 further characterized in that said restrictor is in the shape of a sleeve, movable axially within said valve body toward and away from the outlet.

5. The mixing valve of claim 4 further characterized in that said shaped memory metal actuator has the configuration of a coiled spring and is positioned coaxial with respect to the movement of said restrictor.

6. The mixing valve of claim 1 further characterized in that said valve member rotates to proportion flow and said restrictor moves axially to control flow.

7. The mixing valve of claim 6 further characterized in that said valve member moves axially within said valve body to regulate the volume of water passing through said mixing valve.

8. The mixing valve of claim 6 further characterized in that said valve body includes means preventing axial movement of said valve member.

9. A water temperature sensing/flow control mixing valve including a valve body having hot and cold water inlets and at least one outlet, a mixing valve member positioned within said valve body and controlling the proportion of hot and cold water that flows from said inlets to said outlet, a water flow restrictor positioned within said valve body and movable therein in the area of lowest flow velocity from a normal flow position in which outlet flow is unobstructed to a position in which said restrictor partially closes said outlet to limit flow therefrom, and a spring-shaped memory metal actuator positioned within said valve body to be subject to water flowing therethrough to cause movement of said restrictor from the normal flow position to said flow limiting position when the water within said valve body exceeds a predetermined temperature.

10. The mixing valve of claim 9 further characterized in that said restrictor is an axially movable sleeve which moves within said valve body along a path adjacent to the periphery thereof.

11. The mixing valve of claim 10 further characterized in that the opposite ends of said sleeve are generally open.

12. The mixing valve of claim 10 further characterized in that said spring-shaped memory metal actuator is positioned coaxial with said sleeve.

13. The mixing valve of claim 12 further characterized in that said spring-shaped memory metal actuator is in the configuration of a coil spring which is attached to said sleeve and which contracts to move said sleeve to said flow restricting position.

14. The mixing valve of claim 12 further characterized in that said spring-shaped memory metal spring has the configuration of a coil spring, is attached to said sleeve, and expands to move said sleeve to the flow limiting position.

15. The mixing valve of claim 9 further characterized in that said restrictor is an axially movable open-ended sleeve which moves within said valve body along a path adjacent to the periphery thereof, said memory metal actuator is a coil spring attached to said sleeve and extending coaxially therein.

16. The mixing valve of claim 15 further characterized in that said memory metal coil spring is attached to said mixing valve member.

17. The mixing valve of claim 16 further characterized in that said mixing valve member rotates to control the proportion of hot and cold water flowing through said valve body and reciprocates to control the volume of water flowing through said valve body, said sleeve and memory metal coil spring being movable with said mixing valve member.

18. The mixing valve of claim 16 further characterized in that said mixing valve member rotates to control the proportion of hot and cold water flowing through said valve body, with said mixing valve member being fixed, relative to said valve body, to prevent the axial movement thereof.

19. A water temperature sensing/flow control valve mechanism including a valve body having inlet means and outlet means therein and a flow path therebetween, a water flow restrictor positioned within said valve body and movable in said flow path in the area of lowest flow velocity from a normal flow position in which outlet flow is unobstructed to a position in which said restrictor partially closes said outlet means to limit flow therefrom, and a spring-shaped memory metal actuator attached to said restrictor and coaxial therewith, said spring-shaped actuator being positioned within said valve body in the area of highest flow velocity to cause movement of said restrictor from the normal flow position to said flow limiting position when the water temperature within said valve body exceeds a predetermined temperature.

20. The water temperature sensing/flow control valve mechanism of claim 19 wherein said valve mechanism is a mixing valve.

21. The water temperature sensing/flow control valve mechanism of claim 19 further characterized in that said restrictor is an axially movable open-ended sleeve which moves within said valve body along a path adjacent to the periphery thereof, said memory metal actuator is a coil spring attached to said sleeve and extending coaxially therein, generally in the center of the path of flow from said valve body inlet means to said valve body outlet means.

* * * * *